Patented Aug. 13, 1935

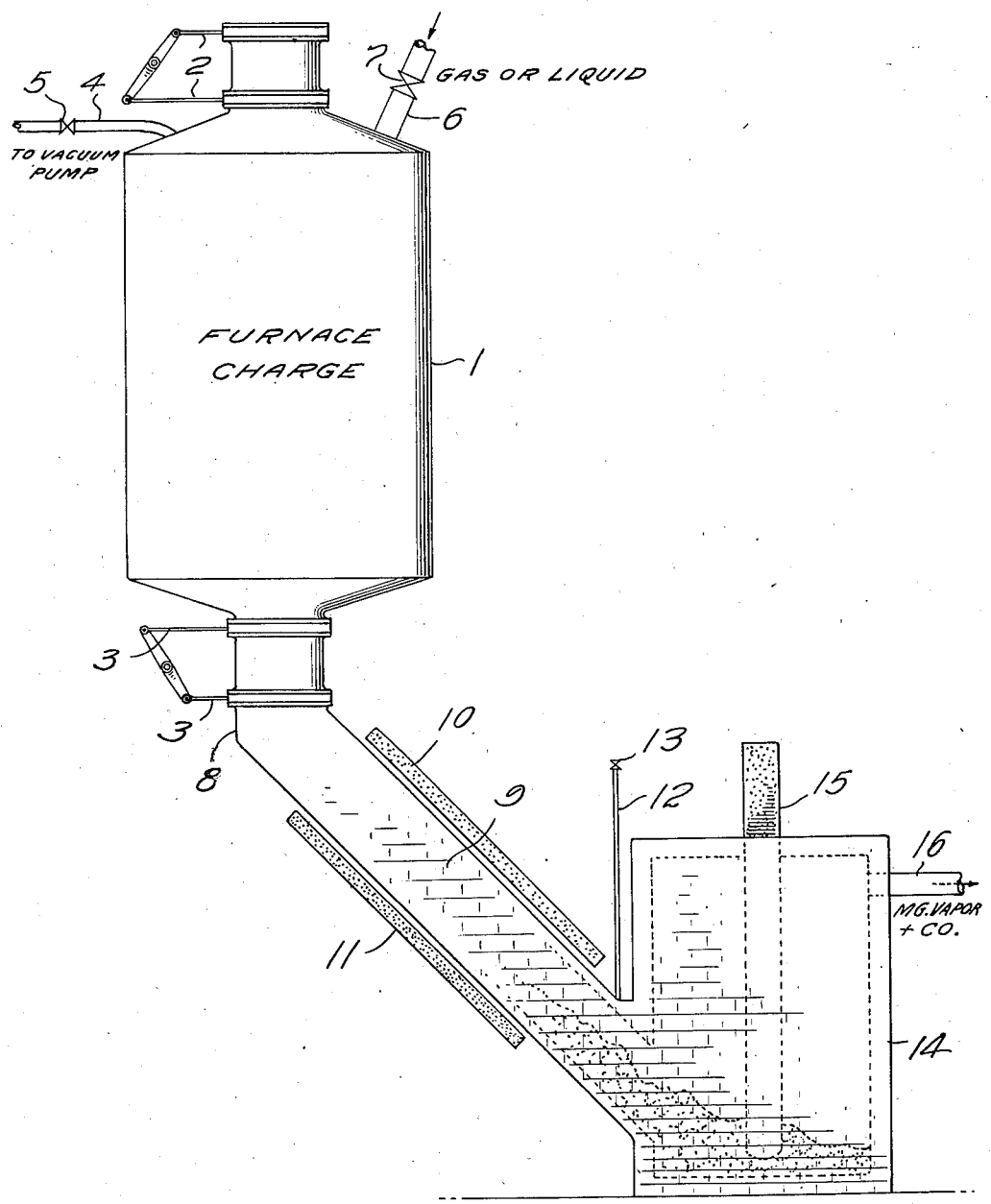

2,011,288

UNITED STATES PATENT OFFICE 2,011,288

METHOD OF TREATING FURNACE CHARGE

Frank R. Kemmer, Larchmont, N. Y., assignor to Magnesium Products, Inc., Wilmington, Del., a corporation of Delaware Application April 7, 1933, Serial No. 664,931

11 Claims. (Cl. 75—17)

This invention relates to the production of magnesium metal and more particularly to the preliminary treatment of the ore prior to a smelting operation wherein magnesium vapor is produced.

This invention is applicable to and may be combined with the process described in my co-pending application, Serial #542,104, dated June 4, 1931, entitled "Method of producing magnesium". In said application I have described a method in which a mixture of magnesium oxide ore and carbonaceous material is heated in an electric furnace causing reduction of the ore and production of magnesium vapor, which is treated in such a manner as to produce a coherent body of metal.

As the result of considerable experimentation I have determined that the introduction of the charge into the furnace in the manner there set forth has certain disadvantages. If the charge is introduced into the furnace in a cold state the circulation of gases and vapors within the furnace causes reversion of the desired reaction by contact with the cold charge. The gases in the furnace consist essentially of magnesium vapor and CO at high temperatures and the circulation of these gases in contact with the cold charge reduces the temperature of the gases locally to a point below the reversion temperature thereby reforming magnesium oxide. This in turn is again reduced and the continuing cycle gives a circulating load which reduces the capacity of the furnace as well as decreases the electrical efficiency thereof.

I have found that the charge carries with it air, water in small quantities and may under some conditions carry carbonates and sulfates. The oxygen, in addition to directly oxidizing some of the magnesium vapor within the smelting furnace, may combine with CO at cooler parts in the furnace forming $CO_2$ which at the hotter parts of the furnace reverts to CO and oxygen which combines with more magnesium vapors and re-oxidizes the same. Water has similar effects in re-oxidizing magnesium vapor. Nitrogen may combine with magnesium in various ways to give nitride, cyanide, cyanamid and the like. Carbonates and sulfates will under the temperature of the furnace decompose to give $CO_2$ and $SO_3$ which are detrimental in a similar manner. The gases issuing from the furnace under such conditions carry substantial amounts of the finely divided MgO which contaminates the condensed finely divided magnesium metal.

My discovery is based upon the realization that even very small amounts of such substances in the furnace charge entering the furnace are extremely detrimental to the efficiency of the process and the eventual production of coherent metal. My invention, therefore, contemplates the removal of air, moisture and other gases from the charge as much as possible prior to introducing the charge into the furnace. My invention also contemplates the heat treatment of the charge to decompose such compounds as carbonates and sulfates and preferably such preheating is carried to a temperature above or close to the maximum reversion temperature which is probably in the neighborhood of 1,100 to 1,200 degrees C. The thus treated charge is then introduced into the furnace and I thereby avoid the production of magnesium oxide in the products of the furnace and by avoiding the presence of other gases, the gases removed from the furnace are substantially magnesium and CO.

In order to carry out the several features of the present invention I provide a process which may be divided into three steps. First, the furnace charge is treated with a partial or complete vacuum to remove substantially all gases and gasifiable substances from between and within the particles of the charge. Second, I then replace such gases with a protective material, preferably at atmospheric or higher pressure. For this purpose I may use a gas such as hydrogen, methane, helium, still gases and the like. It is desirable that the gas used shall not be detrimentally reactive with the charge or with magnesium vapor under the conditions of operation in the furnace. Or, I may use a liquid material which either generates gases or vapors or which decomposes to give the same. Among such substances are crude oil, kerosene, fuel oil and the like. Third, I then preheat the charge to a sufficient extent so that the charge enters the furnace above the maximum temperature at which the equilibrium of the reversible reaction $$MgO+C \rightleftharpoons Mg+CO$$

is displaced to the left.

If an oil has been used in the second stage there will be decomposition of hydrocarbons, giving carbon and hydrogen, which hydrogen may be allowed to remain in the charge and the carbon may provide part or all of the carbon necessary for the reduction. Preferably, under some circumstances, I remove the hydrogen or other gas introduced in the second stage before the charge enters the furnace. This avoids a reaction with the formation of water in the furnace and thus prevents the detrimental effects of water where temperature conditions permit reaction of such water vapor with the magnesium vapor. I may also use hydrogen introduced in the second stage as a reducing agent under suitable furnace operations, whereby the temperature within the furnace is maintained above the maximum temperature at which the resulting magnesium vapor will react with water resulting in the furnace gases from the reduction of magnesium oxide.

As an alternative to the use of a protective gas in the second stage I may use a gas which is inert under these conditions, but which may be detrimental at a later stage and I may either displace it during the preheating stage with an inert gas, or during or after the preheating take it off before the charge enters the furnace.

In the accompanying drawing constituting a part, hereof the single figure is an elevational view, diagrammatic in character, some parts being shown in cross-section, of an apparatus adapted for the practice of this invention.

There is provided a storage bin 1, having its upper and lower ends closed by double valves 2 and 3 of any suitable character. Preferably such valves should be of the type particularly adapted for preventing access of air to vacuum vessels. A pipe 4 controlled by valve 5 leads to a vacuum pump, and a second pipe 6 closed by valve 7 provides means for the introduction of the protective gas or liquid. From the bottom of storage bin 1, there is a duct 8 communicating with angular duct 9, which leads to the furnace. I provide heating elements 10 and 11 of any suitable character, but usually electrical resistors or carbonaceous material, which may be in any desired form. An exit pipe 12 controlled by valve 13 is placed in duct 9 close to the entrance thereof to the furnace. The furnace 14 is provided with an electrode 15 which is adapted to provide an arc between the same and the bottom of the furnace. Exit pipe 16 provides means for taking off the magnesium vapors and CO produced in the furnace.

In the operation of this device the charge of magnesium oxide ore or the like and carbon is introduced into storage bin 1 through closure 2 and the vacuum pump is started with valve 5 open to withdraw from the bin 1 substantially all of the gasifiable material in the charge. Valve 5 is closed and valve 7 is opened to cause the drawing in of the gas or liquid which is to act as a protective material to prevent access of air into the charge. Closure 3 is opened causing the charge to travel through ducts 8 and 9 where it is subjected to a temperature of between 1,100 and 1,200 degrees C. or to a higher temperature to pre-heat the charge. The valve 13 may be opened whereby gases and vapors formed in the preheater are removed. The charge is then fed into the furnace 14 where the reaction produces magnesium vapors and CO which are removed through opening 16 for further treatment.

By this pre-treatment of the charge I have succeeded in eliminating many of the difficulties previously encountered in the production of coherent metallic magnesium from finely divided metallic powder resulting from the condensation of said vapors. I have also eliminated the possibility of formation of magnesium oxide in the vapors within the furnace and have increased the effectiveness of the furnace by eliminating a circulating load. These advantages are of great importance because even a small circulating load will greatly decrease efficiency and even a small amount of magnesium oxide in the vapors will interfere with subsequent treatment.

Although I have described my invention setting forth a single embodiment thereof and illustrating an apparatus in which the invention may be practiced, this description is not intended to limit the invention, but merely to point out the character thereof so as to indicate the scope of the invention. It is, of course, obvious that various changes may be made and, depending upon the conditions involved, some of the steps may be omitted or others may be added. Several steps may be combined in a single step. For instance I may evacuate the bin 1 and not add the protective material, but allow the charge to then pass through the pre-heater and then into the furnace. I may place a partial or full vacuum on pipe 12 to assist in taking out gases liberated in the pre-heater. The apparatus shown is diagrammatic only and it will be apparent that various forms and types of apparatus may be used for the practice of my invention. Instead of feeding the charge by gravity through duct 9 as shown in the drawing, the charge may be finely divided and be blown into the reaction zone of the furnace or through the arc by means of a suitable gas, the gas and solid material being preheated to the proper temperature. In the claims the expression "magnesium oxide" is intended to include not only magnesite, but also any of the other magnesium minerals capable of being reduced to give the metal, such as dolomite. These and other changes may be made within the spirit of this invention, the scope of which is set forth in the claims appended hereto.

It is to be further understood that the above mentioned advantages are not the only ones resulting from the present invention, which is beneficial in other respects also. For example, an additional advantage resides in the fact that in the old practice where a cold charge was fed into the furnace, if there was a rush of charge there was a sudden chilling of the furnace and a consequent tendency to draw air into the system which was likely to cause damage by resulting explosions. This danger is minimized by the present procedure.

What I claim is:—

1. In a method of producing magnesium by the reaction of magnesium oxide and carbon, the improvement which comprises providing a charge of magnesium oxide and an amount of carbonaceous material sufficient to reduce said magnesium oxide, subjecting the same to at least a partial vacuum to remove gases therefrom, replacing said gases with a protective material, then feeding said charge into the reaction chamber and heating the charge to cause reduction to take place without the introduction of any substantial amounts of reducing gas.

2. In a method of producing magnesium by the reaction of magnesium oxide and carbon, the improvement which comprises providing a charge of magnesium oxide and an amount of carbonaceous material sufficient to reduce said magnesium oxide, subjecting the same to at least a partial vacuum to remove gases therefrom, replacing said gases with a protective material of gaseous nature, and then feeding said charge into the reaction chamber and heating the charge to cause reduction to take place without the introduction of any substantial amounts of reducing gas.

3. In a method of producing magnesium by the reaction of magnesium oxide and carbon, the improvement which comprises providing a charge of magnesium oxide and an amount of carbonaceous material sufficient to reduce said magnesium oxide, subjecting the same to at least a partial vacuum to remove gases therefrom, replacing said gases with a protective material of liquid nature, then feeding said charge into the reaction chamber and heating the charge to cause reduction to take place without the introduction of any substantial amounts of reducing gas.

4. In a method of producing magnesium by the reaction of magnesium oxide and carbon, the improvement which comprises providing a charge of magnesium oxide and an amount of carbonaceous material sufficient to reduce said magnesium oxide, subjecting the same to at least a partial vacuum to remove gases therefrom, replacing said gases with a protective material capable of providing carbon for the subsequent reaction, then feeding said charge into the reaction chamber and heating the charge to cause reduction to take place without the introduction of any substantial amounts of reducing gas.

5. In a method of producing magnesium by the reaction of magnesium oxide and carbon, the improvement which comprises providing a charge of magnesium oxide and an amount of carbonaceous material sufficient to reduce said magnesium oxide, preheating the same to a temperature above that at which the equilibrium of the reaction $MgO+C \rightarrow Mg+CO$ is displaced to the left, then feeding said charge into the reaction chamber and heating the charge to cause reduction to take place without the introduction of any substantial amounts of reducing gas.

6. In a method of producing magnesium by the reaction of magnesium oxide and carbon, the improvement which comprises providing a charge of magnesium oxide and an amount of carbonaceous material sufficient to reduce said magnesium oxide, subjecting the same to at least a partial vacuum to remove gases therefrom, replacing said gases with a protective material, preheating the charge, then feeding the same into the reaction chamber and heating the charge to cause reduction to take place without the introduction of any substantial amounts of reducing gas.

7. In a method of producing magnesium by the reaction of magnesium oxide and carbon, the improvement which comprises providing a charge of magnesium oxide and an amount of carbonaceous material sufficient to reduct said magnesium oxide, subjecting the same to at least a partial vacuum to remove gases therefrom, replacing said gases with a protective material, preheating the charge, removing the gaseous products formed, then feeding the same into the reaction chamber and heating the charge to cause reduction to take place without the introduction of any substantial amounts of reducing gas.

8. In a method of producing magnesium by the reaction of magnesium oxide and carbon, the improvement which comprises providing a charge of magnesium oxide and an amount of carbonaceous material sufficient to reduce said magnesium oxide, subjecting the same to at least a partial vacuum to remove gases therefrom, replacing said gases with a protective material, preheating the charge, displacing the gaseous products formed by a gas which is not detrimental in the subsequent reaction, then feeding the same into the reaction chamber and heating the charge to cause reduction to take place without the introduction of any substantial amounts of reducing gas.

9. In a method of producing magnesium, the improvement which comprises providing a charge containing magnesium bearing material, subjecting the same to at least a partial vacuum to remove gases therefrom, replacing said gases with a protective material, feeding the charge into a heated chamber, heating the charge to cause evolution of magnesium metal in the vapor state and condensing the same.

10. In a method of producing magnesium, the improvement which comprises providing a charge containing magnesium bearing material, subjecting the same to at least a partial vacuum to remove gases therefrom, replacing said gases with a protective material of gaseous nature, feeding the charge into a heated chamber, heating the charge to cause evolution of magnesium metal in the vapor state and condensing the same.

11. In a method of producing magnesium, the improvement which comprises providing a charge containing magnesium bearing material, subjecting the same to at least a partial vacuum to remove gases therefrom, replacing said gases with hydrogen, feeding the charge into a heated chamber, heating the charge to cause evolution of magnesium metal in the vapor state and condensing the same.

FRANK R. KEMMER.